(12) United States Patent
Wang et al.

(10) Patent No.: US 12,099,152 B2
(45) Date of Patent: Sep. 24, 2024

(54) X-RAY PHOTON-COUNTING DATA CORRECTION THROUGH DEEP LEARNING

(71) Applicants: Ge Wang, Loudonville, NY (US); Mengzhou Li, Troy, NY (US); David S. Rundle, Butler, PA (US)

(72) Inventors: Ge Wang, Loudonville, NY (US); Mengzhou Li, Troy, NY (US); David S. Rundle, Butler, PA (US)

(73) Assignee: Rensselaer Polytechnic Institute, Troy, NY (US)

( * ) Notice: Subject to any disclaimer, the term of this patent is extended or adjusted under 35 U.S.C. 154(b) by 167 days.

(21) Appl. No.: 17/704,520

(22) Filed: Mar. 25, 2022

(65) Prior Publication Data
US 2022/0308242 A1   Sep. 29, 2022

Related U.S. Application Data

(60) Provisional application No. 63/165,799, filed on Mar. 25, 2021.

(51) Int. Cl.
| | |
|---|---|
| *G01T 1/17* | (2006.01) |
| *G01T 1/36* | (2006.01) |
| *G06N 3/04* | (2023.01) |
| *G06N 3/045* | (2023.01) |
| *G06N 3/047* | (2023.01) |
| *G06N 3/08* | (2023.01) |
| *G06N 3/088* | (2023.01) |
| *G06N 3/126* | (2023.01) |

(52) U.S. Cl.
CPC ............ *G01T 1/17* (2013.01); *G01T 1/171* (2013.01); *G01T 1/36* (2013.01); *G06N 3/045* (2023.01); *G06N 3/047* (2023.01); *G06N 3/08* (2013.01); *G06N 3/088* (2013.01); *G06N 3/126* (2013.01)

(58) Field of Classification Search
CPC .. G01T 1/17; G01T 1/171; G01T 1/36; G06N 3/045; G06N 3/047; G06N 3/08; G06N 3/088; G06N 3/126
See application file for complete search history.

(56) References Cited

U.S. PATENT DOCUMENTS

| | | | |
|---|---|---|---|
| 7,545,965 B2 | 6/2009 | Suzuki et al. | |
| 9,633,306 B2 | 4/2017 | Liu et al. | |
| (Continued) | | | |

FOREIGN PATENT DOCUMENTS

| | | |
|---|---|---|
| WO | 2018200493 A1 | 11/2018 |
| WO | 2019113440 A1 | 6/2019 |

*Primary Examiner* — Mark R Gaworecki
(74) *Attorney, Agent, or Firm* — Barclay Damon, LLP; Anthony P. Gangemi

(57) ABSTRACT

A method for x-ray photon-counting data correction. The method includes generating, by a training data generation module, training input spectral projection data based, at least in part, on a reference spectral projection data. The training input spectral projection data includes at least one of a pulse pileup distortion, a charge splitting distortion, and/or noise. The method further includes training, by a training module, a data correction artificial neural network (ANN) based, at least in part, on training data. The data correction ANN includes a pulse pileup correction ANN, and a charge splitting correction ANN. The training data includes the training input spectral projection data and the reference spectral projection data.

20 Claims, 5 Drawing Sheets

(56) References Cited

U.S. PATENT DOCUMENTS

| | | |
|---|---|---|
| 9,811,886 B2 | 11/2017 | Jeon et al. |
| 10,043,243 B2 | 8/2018 | Matviychuk et al. |
| 10,176,896 B2 | 1/2019 | Sharma et al. |
| 10,522,253 B2 | 12/2019 | Itu et al. |
| 2015/0371378 A1* | 12/2015 | Schmidt .............. G06F 18/2193 382/131 |
| 2018/0018757 A1 | 1/2018 | Suzuki |
| 2019/0005686 A1* | 1/2019 | Liu ........................ G06N 3/08 |
| 2019/0104940 A1 | 4/2019 | Zhou et al. |
| 2019/0108904 A1 | 4/2019 | Zhou et al. |
| 2019/0139276 A1 | 5/2019 | Lee et al. |
| 2019/0251713 A1 | 8/2019 | Chen et al. |

* cited by examiner

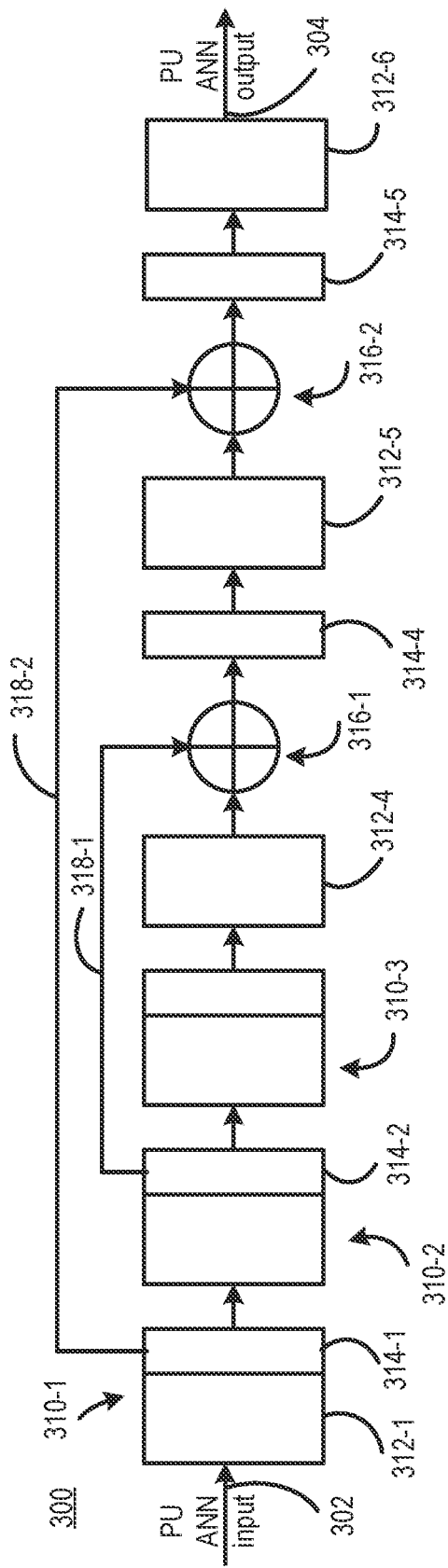
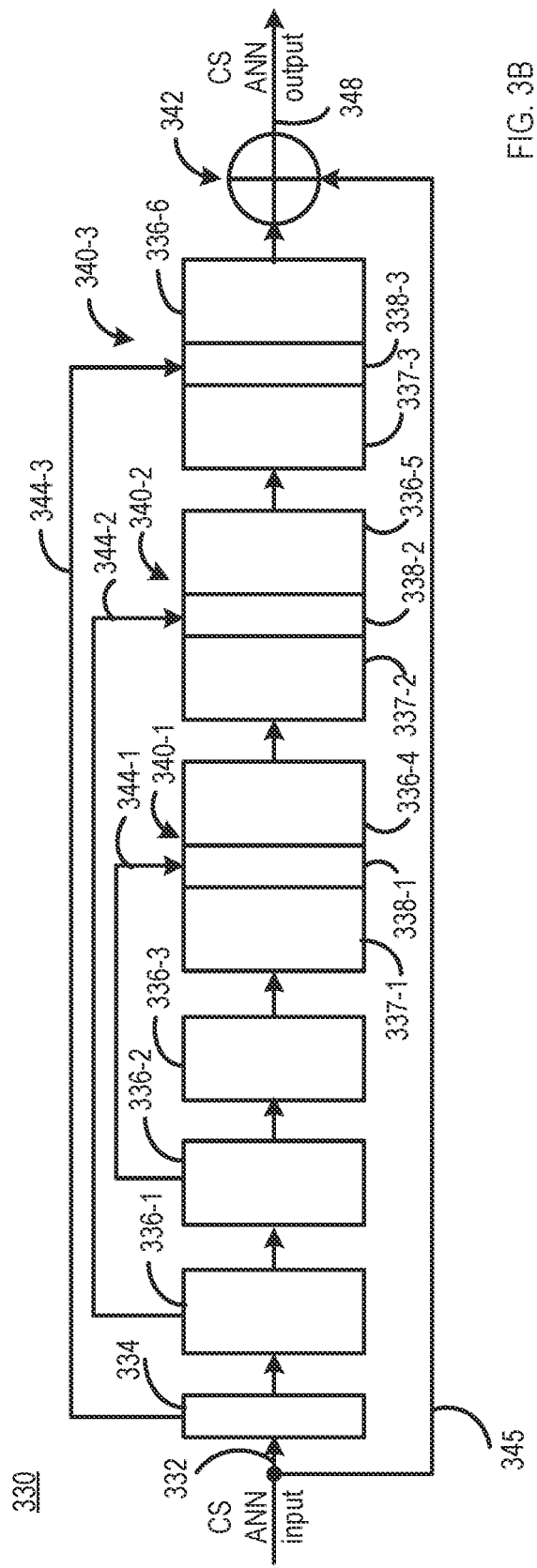
FIG. 3A
FIG. 3B

X-RAY PHOTON-COUNTING DATA CORRECTION THROUGH DEEP LEARNING

CROSS REFERENCE TO RELATED APPLICATION(S)

This application claims the benefit of U.S. Provisional Application No. 63/165,799, filed Mar. 25, 2021, which is incorporated by reference as if disclosed herein in its entirety.

GOVERNMENT LICENSE RIGHTS

This invention was made with government support under award numbers EB026646, and CA237267, awarded by the National Institutes of Health (NIH). The government has certain rights in the invention.

FIELD

The present disclosure relates to deep learning, in particular to, x-ray photon counting data correction through deep learning.

BACKGROUND

X-ray photon counting detectors (PCDs) may be used in astronomy, communication, material science, medical imaging, optical imaging, etc. In operation, PCDs are configured to count photons into different energy bands, in contrast to energy integrating detectors (EIDs). In other words, PCDs may provide a spectral dimension, i.e., data in multiple energy bins, as compared to signals in a single energy bin as may be provided by EIDs. In the medical imaging field, for example, the energy discriminating ability of PCDs may facilitate material decomposition tasks, and alleviate beam hardening and/or metal artifact effects. PCDs may optimally weigh low energy and high energy photons, thus, increasing contrast and/or reducing radiation dose.

Currently, use of PCDs may be limited, related to technical challenges that affect PCD data, including a limited photon counting rate, spatial nonuniformity, and/or spectral distortion. For example, in clinical computed tomography (CT), which uses a relatively high flux x-ray, PCD data may be degraded by a pulse pileup effect that may result in a count loss and spectral distortion. PCDs configured with relatively smaller pixels may yield an increased counting rate as well as a refined image spatial resolution. However, relatively smaller pixels may be susceptible to a charge splitting effect, resulting in a spectral distortion. Charge splitting effects include charge sharing between neighboring pixels and k-shell fluorescence escape from a pixel.

SUMMARY

In an embodiment, there is provided a method for x-ray photon-counting data correction. The method includes generating, by a training data generation module, training input spectral projection data based, at least in part, on a reference spectral projection data. The training input spectral projection data includes at least one of a pulse pileup distortion, a charge splitting distortion, and/or noise. The method further includes training, by a training module, a data correction artificial neural network (ANN) based, at least in part, on training data. The data correction ANN includes a pulse pileup correction ANN, and a charge splitting correction ANN. The training data includes the training input spectral projection data and the reference spectral projection data.

In some embodiments of the method, the training is performed in a Wasserstein generative adversarial network (WGAN) framework.

In some embodiments, the method further includes generating, by the pulse pileup correction ANN, an intermediate estimate based, at least in part, on the training input spectral projection data; and determining, by a guidance loss circuitry, a guidance loss based, at least in part, on the intermediate estimate, and based, at least in part, on a charge splitting distorted target. The charge splitting distorted target is included in the training data.

In some embodiments, the method further includes generating, by the charge splitting correction ANN, a pulse pileup and charge splitting corrected estimate based, at least in part, on the intermediate estimate; and determining, by a correction loss circuitry, a correction loss based, at least in part, on the pulse pileup and charge splitting corrected estimate, and based, at least in part, on a ground truth target. The ground truth target is included in the training data.

In some embodiments, the method further includes generating, by the charge splitting correction ANN, a pulse pileup and charge splitting corrected estimate based, at least in part, on the intermediate estimate; and determining, by a discriminator ANN, a WGAN loss based, at least in part, on the pulse pileup and charge splitting corrected estimate, and based, at least in part, on a ground truth target.

In some embodiments, the method further includes correcting, by the data correction ANN, an actual input spectral projection data to reduce or eliminate one or more of a pulse pileup effect, and/or a charge splitting effect.

In some embodiments of the method, the training includes determining a loss function. The loss function includes a guidance loss, a correction loss, and a discriminator loss.

In an embodiment, there is provided a data correction artificial neural network (ANN) for x-ray photon-counting data correction. The data correction ANN includes a pulse pileup correction ANN; and a charge splitting correction ANN. The pulse pileup correction ANN and the charge splitting correction ANN are trained based, at least in part, on training data. The training data includes training input spectral projection data and a reference spectral projection data. The training input spectral projection data is generated based, at least in part, on the reference spectral projection data. The training input spectral projection data includes at least one of a pulse pileup distortion, a charge splitting distortion, and/or noise.

In some embodiments of the data correction ANN, the training is performed in a Wasserstein generative adversarial network (WGAN) framework.

In some embodiments of the data correction ANN, the pulse pileup correction ANN is configured to receive actual input spectral projection data and to provide an intermediate estimate. The intermediate estimate is corrected for pulse pileup effects.

In some embodiments of the data correction ANN, the charge splitting correction ANN is configured to receive the intermediate estimate and to provide a corrected spectral projection data output. The corrected spectral projection data output is corrected for pulse pileup effects and charge splitting effects.

In some embodiments of the data correction ANN, the reference spectral projection data is generated based, at least in part, on a phantom.

In some embodiments of the data correction ANN, the pulse pileup correction ANN corresponds to a representation network, and the charge splitting correction ANN corresponds to a convolutional neural network.

In an embodiment, there is provided a deep learning system for x-ray photon-counting data correction. The deep learning system includes a data correction ANN, a training data generation module, and a training module. The data correction ANN includes a pulse pileup correction ANN, and a charge splitting correction ANN. The training data generation module is configured to generate training input spectral projection data based, at least in part, on a reference spectral projection data. The training input spectral projection data includes at least one of a pulse pileup distortion, a charge splitting distortion, and/or noise. The training module is configured to train the data correction ANN based, at least in part, on the training data.

In some embodiments of the deep learning system, the training is performed in a Wasserstein generative adversarial network (WGAN) framework.

In some embodiments of the deep learning system, the pulse pileup correction ANN is configured to generate an intermediate estimate based, at least in part, on the training input spectral projection data. A guidance loss circuitry is configured to determine a guidance loss based, at least in part, on the intermediate estimate, and based, at least in part, on a charge splitting distorted target. The charge splitting distorted target is included in the training data.

In some embodiments of the deep learning system, the charge splitting correction ANN is configured to generate a pulse pileup and charge splitting corrected estimate based, at least in part, on the intermediate estimate; and a correction loss circuitry is configured to determine a correction loss based, at least in part, on the pulse pileup and charge splitting corrected estimate, and based, at least in part, on a ground truth target. The ground truth target is included in the training data.

In some embodiments of the deep learning system, the charge splitting correction ANN is configured to generate a pulse pileup and charge splitting corrected estimate based, at least in part, on the intermediate estimate. A discriminator ANN is configured to determine a WGAN loss based, at least in part, on the pulse pileup and charge splitting corrected estimate, and based, at least in part, on a ground truth target.

In some embodiments of the deep learning system, the data correction ANN is configured to correct an actual input spectral projection data to reduce or eliminate one or more of a pulse pileup effect, and/or a charge splitting effect.

In some embodiments of the deep learning system, the pulse pileup correction ANN corresponds to a representation neural network, and the charge splitting correction ANN corresponds to a convolutional neural network.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein:

FIG. 3A illustrates a functional block diagram of one example pulse pileup correction artificial neural network (ANN) architecture ("dePUnet");

FIG. 3B illustrates a functional block diagram of one example charge splitting correction ANN architecture ("deCSnet");

Figure 1:
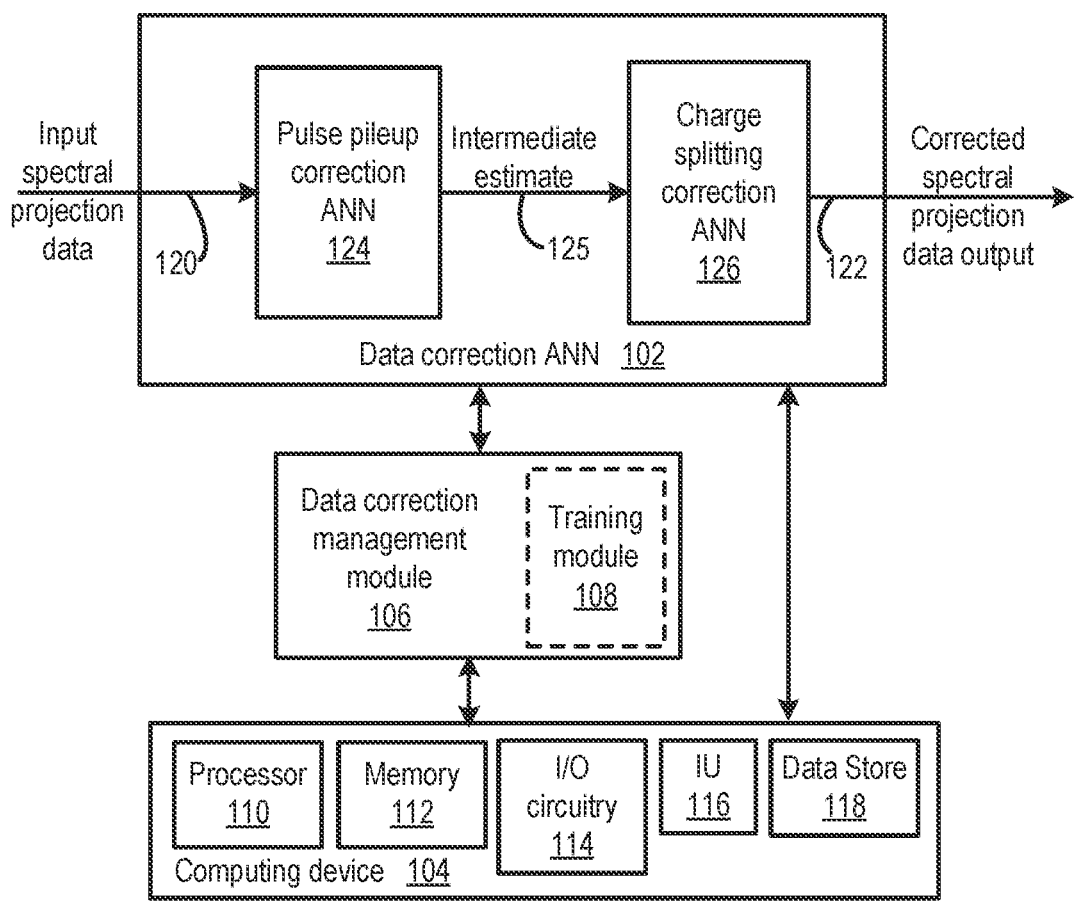
FIG. 1 illustrates a functional block diagram of a deep learning system for x-ray photon counting data correction, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to x-ray photon counting data correction through deep learning. A method, apparatus and/or system may be configured to correct spectral distortion that may result from pulse pileup (PU), charge splitting (CS), and noise effects. As used herein, "correct" means "mitigate" and includes reduce and/or eliminate. Pulse pileup may correspond to intra-pixel distortion, and charge splitting may correspond to inter-pixel distortion, i.e., inter-pixel cross-talk.

A data correction circuitry, according to the present disclosure, may include a PU correction circuitry and a CS correction circuitry. The PU correction circuitry and the CS correction circuitry may each correspond to an artificial neural network (ANN). As used herein, ANN may include, but is not limited to, a deep ANN (DNN), a convolutional neural network (CNN), a deep CNN, a multilayer perceptron (MLP), etc. An ANN may be implemented in, and/or correspond to, circuitry, as described herein. In one nonlimiting example, PU correction ANN and CS correction ANN may each correspond to a respective DNN. The data correction ANN may be configured to receive input spectral projection data that corresponds to PCD data, and may thus include one or more of PU effects, CS effects and/or noise. The data correction circuitry may be configured to correct the received input spectral projection data for PU, CS and/or noise, and to provide a corrected spectral projection data as output. The corrected spectral projection data output may then correspond to a PU and CS corrected estimate, i.e., corrected PCD data.

In an embodiment, the data correction ANN may be trained prior to application to actual PCD data correction tasks. In an embodiment, the training may be performed using simulated training data. Simulated training data may include training input spectral data, PU-corrected target data, and ground truth target data. The training input spectral data may include PU effects, CS effects, and may include noise (e.g., Poisson noise) effects. The PU-corrected target data may include CS distorted target data without noise effects. The ground truth target data may correspond to spectral data without PU effects, CS effects, and noise effects, i.e., may correspond to reference spectral projection data. In some embodiments, training may include generating the simulated training input spectral data.

In an embodiment, simulated training data may be generated based, at least in part, on one or more phantoms. In one nonlimiting example, a plurality of phantoms may be generated that have a variety of shapes and compositions with 3D (three-dimensional) printing and/or liquid tissue surrogate techniques to generate phantom characteristic data. Each phantom of the plurality of generated phantoms may then have known respective phantom characteristic data. Phantom characteristic data for each phantom may include a respective geometry and a respective material composition. Ideal spectral data may then be determined for each phantom using, for example, a linear attenuation coefficient (LAC) database from the National Institute of Standards and Technology (NIST) and an x-ray source spectrum simulation technique. The data correction circuitry may then be trained to map corresponding training spectral projection data (i.e., distorted noisy projections) to non-distorted noise-free ground truth projection data. The trained data correction circuitry may then be applied for correction of actual PCD projection data. It may be appreciated that, utilizing this technique, the corresponding PCD-based reconstruction results may be calibrated to the NIST database, thus enabling quantitative CT.

In an embodiment, the training may be performed using a Wasserstein generative adversarial network (WGAN) framework. As is known, a WGAN includes a generator network and a discriminator network. The generator network is trained using the discriminator network. The discriminator network is configured to compare an output of the generator network with a ground truth. In this embodiment, the discriminator network may correspond to a DNN.

In an embodiment, the training may be performed using a loss function that may include one or more contributing losses. The loss function may include one or more of a guidance loss, a correction loss, and/or a WGAN loss. The guidance loss is configured to compare target spectral data that includes CS effects but not PU effects and without noise, with an intermediate estimate that corresponds to the training input spectral projection data after PU correction. Thus, the intermediate estimate may include CS effects and/or noise. The correction loss is configured to compare target spectral data that does not include CS effects and PU effects and without noise, i.e., ground truth target data, with a PU and CS corrected estimate that corresponds to a data correction circuitry output. The WGAN loss is related to the WGAN training framework and corresponds to a discriminator circuitry output. Continuing with the WGAN training framework, the data correction circuitry may then correspond to the generator network.

Thus, a method, apparatus, and/or system, according to the present disclosure, may be configured to train a data correction circuitry using simulated PCD spectral data, and may then be configured to correct PU effects, CS effects, and/or noise. Use of PCDs and their beneficial spectral data may thus be facilitated.

In an embodiment, there is provided a method for x-ray photon-counting data correction. The method includes generating, by a training data generation module, training input spectral projection data based, at least in part, on a reference spectral projection data. The training input spectral projection data includes at least one of a pulse pileup distortion, a charge splitting distortion, and/or noise. The method further includes training, by a training module, a data correction artificial neural network (ANN) based, at least in part, on training data. The data correction ANN includes a pulse pileup correction ANN, and a charge splitting correction ANN. The training data includes the training input spectral projection data and the reference spectral projection data.

FIG. 1 illustrates a functional block diagram of a deep learning system 100 for x-ray photon counting data correction, according to several embodiments of the present disclosure. Deep learning system 100 includes a data correction ANN 102, a computing device 104, and a data correction management module 106. In some embodiments, deep learning system 100, e.g., data correction management module 106, may include a training module 108. Data correction ANN 102 and/or data correction management module 106 may be coupled to or included in computing device 104. The data correction ANN 102 is configured to receive input spectral projection data 120 and to provide corrected spectral projection data output 122, as will be described in more detail below. The input spectral projection data 120 may include pulse pileup (PU) effects, charge splitting (CS) effects, and/or noise and the corrected spectral projection data output data may include reduced and/or eliminated PU effects, reduced and/or eliminated CS effects, and/or reduced and/or eliminated noise.

Data correction ANN 102 includes a PU correction ANN 124, and a CS correction ANN 126. In an embodiment, PU correction ANN 124, and CS correction ANN 126 may each correspond to a respective DNN. In an embodiment, PU correction ANN 124 may correspond to a representation neural network. In one nonlimiting example, PU correction ANN 124 may correspond to an auto-encoder architecture. In an embodiment, CS correction ANN 126 may correspond to a convolutional neural network, i.e., a CNN.

In operation, data correction ANN 102, i.e., PU correction ANN 124, and CS correction ANN 126, may initially be trained using, for example, simulated training data, as will be described in more detail below. After training, the PU correction ANN 124 may be configured to receive actual spectral projection data, i.e., input spectral projection data 120, that includes one or more of PU effects, CS effects and/or noise. The PU correction ANN 124 is configured to produce an intermediate output 125 with PU effects reduced or eliminated but with CS effects and possibly some noise remaining. The intermediate estimate 125 then corresponds to an input to CS correction ANN 126. The CS correction ANN 126 is configured to produce corresponding corrected spectral projection data output 122. The corrected spectral projection data output 122 may then be corrected for PU effects, CS effects, and/or noise, that may be present in the input spectral projection data 120.

Computing device 104 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. Computing device 104 includes a processor 110, a memory 112, input/output (I/O) circuitry 114, a user interface (UI) 116, and data store 118.

Processor 110 is configured to perform operations of data correction ANN 102 and/or data correction management module 106. Memory 112 may be configured to store data associated with data correction ANN 102 and/or data correction management module 106. I/O circuitry 114 may be configured to provide wired and/or wireless communication functionality for deep learning system 100. For example, I/O circuitry 114 may be configured to receive input spectral projection data 120 and to provide corrected spectral projection data output 122. UI 116 may include a user input device (e.g., keyboard, mouse, microphone, touch sensitive display, etc.) and/or a user output device, e.g., a display. Data store 118 may be configured to store one or more of input spectral projection data 120, intermediate estimate 125, corrected spectral projection data output 122, network parameters associated with PU correction ANN 124 and/or CS correction ANN 126, and data associated with data correction management module 106 and/or training module 108. Data associated with training module 108 may include, for example, training data, as described herein.

Thus, prior to operation on actual spectral projection data, data correction ANN 102 (i.e., PU correction ANN 124 and/or CS correction ANN 126) may be trained by data correction management module 106, e.g., training module 108 based, at least in part, on training input spectral data, that may be generated, as described herein.

Figure 2:
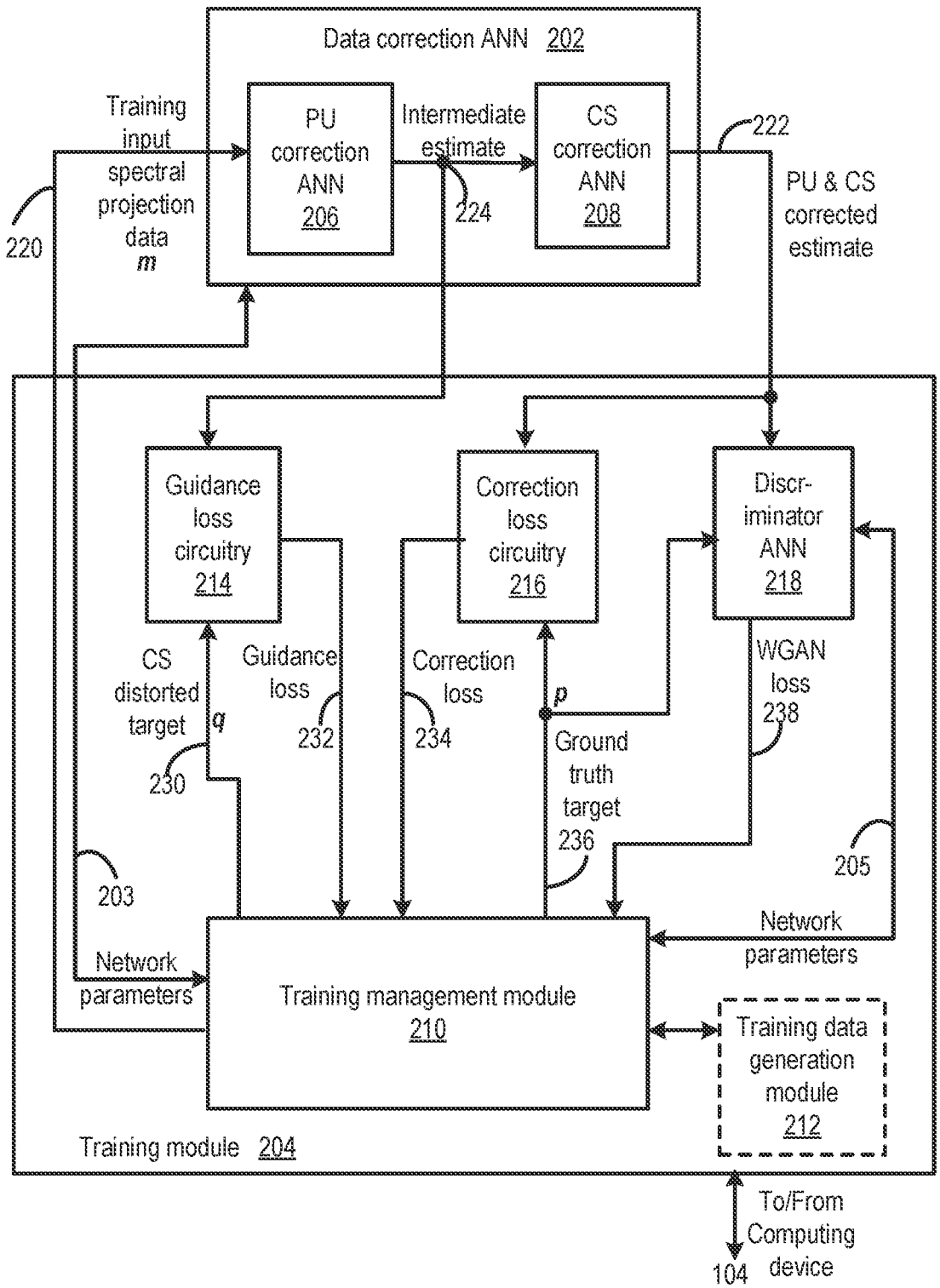
FIG. 2 illustrates a functional block diagram of an example x-ray photon counting data correction training system, according to an embodiment of the present disclosure.

FIG. 2 illustrates a functional block diagram 200 of an example x-ray photon counting data correction training system, according to an embodiment of the present disclosure. Training system 200 includes data correction ANN 202, and training module 204. Data correction ANN 202 is one example of data correction ANN 102, and training module 204 is one example of training module 108 of FIG. 1. Generally, training module 204 is configured to train data correction ANN 202. The trained data correction ANN 202 may then be used in deep learning system 102 to correct x-ray photon counting data, i.e., to correct for PU effects, CS effects, and/or noise, as described herein.

Data correction ANN 202 is configured to receive training input spectral projection data (e.g., m) 220 and to provide as output, a PU and CS corrected estimate (e.g., G(m)) 222, corrected for pulse pileup (PU) and charge splitting (CS). Data correction ANN 202 includes PU correction ANN 206 and CS correction ANN 208. In an embodiment, PU correction ANN 206 may correspond to a representation neural network, e.g., an auto-encoder architecture. In an embodiment, CS correction ANN 208 may correspond to a CNN. The data correction ANN 202 (i.e., PU correction ANN 206 and CS correction ANN 208) may be configured to receive network parameters 203 from training module 204, during training. The network parameters 203 may be adjusted during training, related to operation of training module 204, as described herein.

Training module 204 includes a training management module 210, and may include training data generation module 212. Training module 204 includes a guidance loss circuitry 214, a correction loss circuitry 216, and a discriminator ANN 218. Training system 200, that includes data correction ANN 202 and training module 204, may thus correspond to a generative adversarial network (GAN) where data correction ANN 202 corresponds to a generator network and discriminator ANN 218 corresponds to a discriminator network.

In operation, training data generation module 212 may be configured to retrieve and/or generate training data that includes training input spectral data (e.g., m) 220, CS distorted target data (e.g., q) 230, and ground truth target data (e.g., p) 236. In some embodiments, ground truth target data (e.g., p) 236 may correspond to reference spectral projection data, as described herein. In one nonlimiting example, the training data may be stored in data storage 118 of FIG. 1.

In an embodiment, the training data (including training input spectral projection data, i.e., PCD data) may be generated by training data generation module 212. PCD data may be generated based, at least in part, on a polychromatic source, and based, at least in part, on energy dependent attenuation curves. An x-ray source spectrum may be simulated using, for example, a software program. In one nonlimiting example, the x-ray source may be simulated using SpekCalc, a software program (developed by researchers at The Institute of Cancer Research, London, UK, in 2007) for calculating the x-ray emission spectra from tungsten anodes, operated in a diagnostic energy range. However, this disclosure is not limited in this regard. In one nonlimiting example, a simulated spectrum may range from 12 keV (kilo electron volts) to 120 keV with a resolution of 1 keV. A distance between a selected phantom and a corresponding x-ray source may be 1 meter, and a default filtration may correspond to 0.8 mm (millimeters) Beryllium, 1 mm Aluminium and 0.11 mm Copper.

Objects to be scanned for data generation may include a plurality of Shepp-Logan phantoms with random shapes and a variety of material compositions. In one nonlimiting example, a phantom may be configured as a 256*256*256 cube with voxel size of $0.11^3$ mm$^3$, and a number of ellipsoids, e.g., 5, with each ellipsoid corresponding to a respective material composition, may be positioned within a sphere with a selected radius, e.g., 1.28 cm (centimeters) centered in the cube. The geometry of each ellipsoid may be randomly specified by a center position in spherical coordinates (r, θ, $θ_z$), semi-axes (a, r, r), and an orientation angle around the z axis, $φ_z$. A number, e.g., five, of material types (e.g., soft tissue, adipose tissue, brain grey and white matter, blood, and cortical bone) may be assigned to the five ellipsoids. A plurality of ellipsoids may overlap, and the material composition of an overlapped pixel is assigned with the equal-volume mixture of the involved ellipsoids. Gaps may be present between a plurality of ellipsoids, a sphere boundary may be filled with water, and a space outside the sphere may correspond to air. The size and roundness of the ellipsoids may be constrained according to their material types. The roundness (represented by a relative magnitude difference between a and r) of soft tissue, adipose tissue, brain tissue and bone may be gradually decreasing; i.e., bone may be in a bar shape while soft tissue may be relatively close to a sphere shape. The roundness of blood may be randomly selected. Similarly, the ellipse size (represented by the magnitude of a and r) may be similarly decreasing in a similar order except for bone which may be relatively large. However, this disclosure is not limited in this regard.

The spectral LAC (linear attenuation coefficient) data (e.g., spectral LAC in cm$^{-1}$ vs. photon energy in keV, and/or spectral LAC in Hounsfield units (HU) vs. photon energy in keV) for representative human tissues and other materials may be acquired from the NIST database, as described herein. In one nonlimiting example, LAC values at energy points between the NIST data points may be interpolated via log-log cubic-spline fitting.

Based, at least in part, on the x-ray spectrum and based, at least in part, on the material phantoms, a number (e.g., 180) of spectral projections may be generated for each phantom in, for example, a parallel beam configuration. However, this disclosure is not limited in this regard.

Thus, training input spectral projection data may be generated corresponding to a range of phantom configurations and material compositions.

It may be appreciated that the generated training input spectral projection data may correspond to ideal spectral data. The generated ideal projection data may be configured to represent a plurality of spectral attenuation properties. Actual photon counting detector spectral projection data may include charge splitting distortion, pulse pileup distortion, and/or noise, as described herein. Charge splitting distortion may be simulated (i.e., modeled) using a software program, e.g., Photon Counting Toolkit (PcTK version 3.2, included in Matlab available from MathWorks, Natick, Massachusetts). The model provides a variety of cases of major interactions between x-ray photons in a diagnostic energy range and a PCD sensor crystal (e.g., cadmium telluride, CdTe) in a probability framework, including, free penetration with no detection, full detection without fluorescence, partial detection with fluorescence loss, and full detection with fluorescence reabsorbed. It may be appreciated that charge splitting may occur with or without fluorescence generation, where primary charge electron clouds may be split by neighboring pixels, resulting in a downward shift in detected energy and an increase in counts in the lower energy bins. In the case of partial detection with fluorescence loss, the primary electron clouds may lose the energy carried by the fluorescence photon, enhancing the low-energy shift. The low-energy shift may be further enhanced by the full detection with fluorescence reabsorbed case.

In one nonlimiting example of modeling charge splitting distortion, for one x-ray photon of energy incident, $E_i$, on a target pixel, respective count expectations in each energy channel of nine pixels (the target pixel plus eight surrounding pixels) may be recorded in corresponding diagonal elements in a normalized covariance matrix, with 1 keV width energy windows. Noise may be added via convolution with a one-dimensional zero mean Gaussian kernel characterized by a parameter $\sigma_c$ along the diagonal elements, yielding an energy resolution degradation. It may be appreciated that the diagonal of the matrix may correspond to a spectral response function of the detector. Poisson noise may then be added pixel by pixel.

A charge splitting simulation may be configured according to an effective electron cloud radius, an electronic noise parameter, a pixel size of a corresponding detector, a thickness of a sensor. In one nonlimiting example the effective electron cloud radius may be 24 μm (micrometers), the electronic noise parameter may be 2.0 keV, the pixel size of the detector may be 110 μm, and the thickness of the sensor may be 2 mm. However, this disclosure is not limited in this regard.

Thus, using the generated spectral projection data, a total spectral response of a PCD may be determined and charge splitting distorted spectral images may be generated. Poisson noise may then be added to generate noisy spectral projection data. The noisy spectral projection data may then be provided to a pulse pileup model to generate the training spectral projection data that includes pulse pileup distortion, charge splitting distortion, and noise.

In one nonlimiting example, the pulse pileup effect may be simulated with a paralyzable model. The pulse pileup distortion may be determined in a pixel—wise manner related to the intra-pixel effect of pulse pileup distortion. It may be appreciated that pulse pileup distortion may correspond to interactions of photons resulting in a level crossing by a combination of the interacting photons over a predetermined threshold. In one nonlimiting example, pulse shapes may be modeled as $g(t)=e^{-t/\tau}$ for positive t and zero otherwise, and a dead time, t, may be 10 ns (nanoseconds). The pulse pileup effect may then be simulated by increasing the x-ray intensity to greater than the normal x-ray source intensity. It may be appreciated that the pulse pileup effect may result in a monotonically increasing photon count. It may be further appreciated that the pulse pileup effect may shift photon counts from lower energy bins to higher energy bins.

Thus, training data may be generated that includes charge splitting distortion, pulse pileup distortion, and noise. Nonlimiting examples of simulating charge splitting distortion, pulse pileup distortion, and noise have been described, however, this disclosure is not limited in this regard, and other simulation techniques may be implemented, within the scope of this disclosure.

In an embodiment, training system 200 may correspond to and/or may be configured to implement a WGAN framework. A goal of a WGAN is to build a mapping G that transforms degraded projection measurements, $m \in \mathbb{R}^{N \times N \times N_E}$ to the ideal, i.e., reference, projection data, $p \in \mathbb{R}^{N \times N \times N_E}$. In other words, a distribution of degraded spectral projections may be modified to approach a distribution of ideal data by refining G in a data-driven manner. In the Generative Adversarial Network (GAN) framework, a discriminator network D is configured to help train the mapping network also referred to as the generator G. The generator G takes the input and transforms it toward the corresponding target, while the discriminator tries to discriminate between the output of G and the target. During the training, G receives feedback from D and other metrics then generates more realistic results, while D receives feedback from the labels for the output of G and the target then continuously improves its discrimination ability. Through this adversarial competition between D and G, G is expected to learn the characteristics of the target data distribution without involving an explicit loss function, as the discriminator D may play the role of the loss function guiding the training of G). As a result, G may be configured to learn relatively complex representations of underlying data through adversarial learning. An expected final equilibrium is that the output distribution of G is so close to the ground truth distribution that D fails to tell differences between the two.

The Wasserstein distance computes the cost of mass transportation from one distribution to the other. Thus, the solution space of G may be compressed, and the training process may be facilitated. The adversarial loss function (i.e., WGAN loss) may be written as:

$$\min_D \max_G L_{WGAN}(D, C) = \qquad (1)$$
$$-\mathbb{E}_p[D(p)] + \mathbb{E}_m[D(G(m))] + \lambda \mathbb{E}_{\hat{p}}[(\|\nabla_{\hat{p}} D(\hat{p})\|_2 - 1)^2]$$

where the first two terms represent the Wasserstein distance estimation, the last term is the gradient penalty which is an alternative of weights clipping to enforce the Lipschitz constraint on the discriminator for better stability, $\hat{p}$ is uniformly sampled along a straight line between paired G(m) and p, and a penalty coefficient, λ, is a weighting constant.

Referring now to FIG. 2, as used herein, data correction ANN 202 may correspond to the generator (G), and discriminator ANN 218 may correspond to the discriminator (D), within the GAN framework. Training input spectral projection data 220 corresponds to m, the corrected estimate 222 corresponds to G(m), p corresponds to a ground truth target 236, and q corresponds to a CS distorted target that may be compared to an intermediate estimate 224 (e.g., m̃). Training management module 210 is configured to provide the training input spectral data 220 to PU correction ANN 206. PU correction ANN 206 is configured to provide the intermediate estimate 224 as output. The intermediate estimate 224 may include the training input spectral data corrected for PU effects. The intermediate estimate 224 may thus include CS effects and/or noise. CS correction ANN 208 is configured to receive the intermediate estimate 224 and to provide the PU and CS corrected estimate 222 as output.

Guidance loss circuitry 214 is configured to receive the intermediate estimate 224 from PU correction ANN 206 and a CS-distorted target data 230 from training management module 210. Guidance loss circuitry 214 may then determine a guidance loss 232 based, at least in part, on the intermediate estimate 224, and based, at least in part, on the CS-distorted target data 230. The guidance loss 232 may then be provided to training management module 210. The training management module 210 may then be configured to adjust one or more network parameters 203 based, at least in part, on a loss function that includes the guidance loss 232.

Correction loss circuitry 216 is configured to receive the PU and CS corrected estimate 222 from CS correction ANN 208 and a ground truth target 236 from training management module 210. The ground truth target 236 may correspond to reference spectral projection data, as described herein. Correction loss circuitry 216 may then determine a correction loss 234 based, at least in part, on the PU and CS corrected estimate 222, and based, at least in part, on the ground truth target 236. The correction loss 234 may then be provided to training management module 210. The training management module 210 may then be configured to adjust one or more network parameters 203 based, at least in part, on a loss function that includes the correction loss 234.

Discriminator ANN 218 is configured to receive the PU and CS corrected estimate 222 from charge splitting correction ANN 208 and the ground truth target 236 from training management module 210. Discriminator ANN 218 may then determine a WGAN loss 238 based, at least in part, on the PU and CS corrected estimate 222, and based, at least in part, on the ground truth target 236. The WGAN loss 238 may then be provided to training management module 210. The training management module 210 may then be configured to adjust one or more network parameters 203 of the data correction ANN 202, and network parameters 205 of the discriminator ANN 218 based, at least in part, on a loss function that includes the WGAN loss 238.

Mathematically, generation of the training spectral projection data (corresponding to a forward degradation model that includes PU effects, CS effects and noise) may be written as:

$$q(x,y,E) = \int p(x,y,E') \otimes srf(x,y,E',E) dE'$$

$$x,y$$

$$m = f_{PU}[P(q)]$$

where $q \in \mathbb{R}^{N \times N \times N_E}$ is the corresponding clean (i.e., without noise) charge splitting signal data of the m and p pair; $\otimes_{(x,y)}$ corresponds to a convolution operation on width and height dimensions, $srf(x, y, E_{in}, E_{out})$ is the spectral response function of the photon counting detector; PO stands for Poisson distribution; and $f_{PU}(E)$ represents the pulse pileup transformation. In an embodiment, the clean charge splitting data 230 (e.g., q) may be provided as a reference for the intermediate estimate 224 (e.g., m̃), and may facilitate convergence.

A generator loss may include a correction error (i.e., correction loss 234), an intermediate error (i.e., a guidance loss 232) and a generation error (i.e., a WGAN loss 238). The correction error is configured to measure a difference between the data correction ANN output (e.g., PU and CS corrected estimate 222, G(m)) and the ground truth target, p. The correction error may include both a relative error (corresponding to an open beam correction before reconstruction) and an absolute error (configured to improve a reconstruction accuracy and avoid overweighting small values). Thus, in one nonlimiting example, the correction loss ($L_{Correction}$) may be written as:

$$L_{Correction} = \mathbb{E}_{m,p}|G(m) - p|^2 + \mathbb{E}_{m,p}\left|\frac{G(m) - p}{p + \epsilon}\right|,$$

where the first term is a mean square error (MSE) of an absolute difference, and the second term is a mean absolute error (MAE) of a relative difference. The MSE metric focuses on reducing large errors. The MAE of relative errors is configured to penalize discrepancies from small ground truth values, with constant E in the second term set to $1 \times 10^{-4}$, for example, to stabilize the ratio.

The intermediate error (i.e., guidance loss 232) is configured to measure a difference between the intermediate output 224 (m̃) of the PU correction ANN 206 and the clean charge splitting signal (i.e., the CS-distorted target, q). This constraint is configured to make the intermediate estimate 224 interpretable as pileup correction result in a physical sense. A main goal of the intermediate loss (i.e., guidance loss 232) is to introduce latent features and help the data correction ANN 202 training under physics-based guidance. Thus, in one nonlimiting example, the guidance loss ($L_{Guidance}$) may be written as:

$$L_{Guidance} = \mathbb{E}_{m,q}|\tilde{m} - q|^2,$$

where m̃ represents the output (i.e., intermediate estimate 224) from PU correction ANN 206.

The generation error is related to the adversarial training, as described herein, and as described in Eq. 1. It may be appreciated that the WGAN framework corresponds to adversarial training of both a generator (e.g., data correction ANN 202) and a discriminator (e.g., discriminator ANN 218). In other words, during the training, both the generator and the discriminator learn. Training system 200 is configured to implement adversarial training in the WGAN framework. In particular, training management module is configured to adjust network parameters 203 of the generator (i.e., data correction ANN 202) and network parameters 205 of the discriminator ANN 218, within the WGAN framework, as described herein. The WGAN loss 238 may thus include or correspond to the generation error. Mathematically, the generation error corresponds to a discriminator loss that corresponds to the adversarial training objective, i.e., the second term of Eq. 1.

A total generator loss function may thus include contributions from the guidance loss 232, the correction loss 234, and the WGAN loss 238. The total generator loss ($L_G$) may be written as:

$$L_G =$$

$$-\mathbb{E}_m\left[D(G(m)) + \lambda_1 \mathbb{E}_{m,p}|G(m) - p|^2 + \lambda_2 \mathbb{E}_{m,p}\left|\frac{G(m) - p}{p + \epsilon}\right| + \lambda_3 \mathbb{E}_{m,q}\|\tilde{m} - q\|_2,$$

where $\lambda_1$, $\lambda_2$ and $\lambda_3$ are the constant balancing weights.

The training module 204, e.g., the training management module 210, may be configured to train the data correction ANN 202, that includes the PU correction ANN 206 and the CS correction ANN 208, within a WGAN adversarial framework. The training management module 210 may be configured to adjust generator network parameters 203 and discriminator network parameters 205, during the training, to minimize a generator loss function ($L_G$).

FIG. 3A illustrates a functional block diagram 300 of one example pulse pileup correction ANN architecture ("dePUnet"). dePUnet circuitry 300 is one example of pulse pileup correction ANN 124 of FIG. 1 and pulse pileup correction ANN 206 of FIG. 2. As used herein, "dePUnet circuitry" corresponds to an artificial neural network (ANN) architecture configured to reduce or eliminate pulse pileup effects and is one example of pulse pileup correction ANN 124, 206. dePUnet circuitry 300 is one example of a representation network. dePUnet circuitry 300 is configured to receive a PU ANN input 302 and to provide a PU ANN output 304. The PU ANN input 302 corresponds to input spectral data, e.g., input spectral projection data 120, 220, and the PU ANN output 304 corresponds to a PU-corrected estimate, e.g., intermediate estimate 125, 224.

dePUnet circuitry 300 includes a plurality of convolutional blocks 310-1, 310-2, 310-3, arranged in series. Each convolutional block, e.g., convolutional block 310-1, includes a convolution layer 312-1 followed by a leaky rectified linear unit (ReLU) 314-1. dePUnet circuitry 300 further includes a fourth convolutional layer 312-4, a first summing node 316-1, a fourth leaky ReLU 314-4, a fifth convolution layer 312-5, a second summing node 316-2, a fifth leaky ReLU 314-5, and a sixth convolution layer 312-6. Each convolution layer has a respective kernel size, k, a stride, s, and a number of kernels, n. In one nonlimiting example, the kernel size is 1 and the stride is 1 for each convolutional layer in the dePUnet circuitry 300. However, this disclosure is not limited in this regard. The number of kernels may be related to a number of x-ray spectral channels (i.e., a number of energy bins, NE). In one nonlimiting example, the number of kernels, n, may be 16NE, 8NE, 4NE, 8NE, 16NE, and 1NE, beginning with a first convolutional block 310-1 and ending with the sixth convolution layer 312-6. However, this disclosure is not limited in this regard. dePUnet circuitry 300 further includes two skip connections (i.e., shortcuts) 318-1, 318-2 configured to couple a selected leaky ReLU to a selected summing node. A first skip connection 318-1 is configured to couple a second leaky ReLU 314-2 to the first summing node 316-1, and the second skip connection 318-2 is configured to couple the first ReLU 314-1 to the second summing node 316-2.

The structure of dePUnet 300 is related to the intra-pixel effect nature of pulse pileup, which yields cross-talk only between spectral channels of one pixel during a readout. In one nonlimiting example, the convolutional layers may have a 1×1 kernel size, configured to conduct spectral transformation for each associated pixel. dePUnet 300 is configured to correct PU ANN input, e.g., noisy pileup data, to clean charge splitting data instead of correcting the noisy pileup data to the noisy charge splitting data. It may be appreciated that it is easier for the correction ANN to learn denoising rather than learning to represent noisy signals, related to a regularization property of the dePUnet architecture. Mapping to clean charge splitting data may facilitate subsequent correction operations. In one nonlimiting example, dePUnet may correspond to an auto-encoder with shortcuts 318-1, 318-2. The shortcuts 318-1, 318-2 may facilitate training. The leaky ReLU activation is used for all convolutional layers except for the last layer 312-6 whose output 304 corresponds to clean charge splitting data, e.g., intermediate estimate 125, 224.

Thus, the dePUnet architecture 300 is one example of a pulse pileup correction ANN architecture, and may corresponds to a representation ANN.

FIG. 3B illustrates a functional block diagram 330 of one example charge splitting correction ANN architecture ("deCSnet"). deCSnet circuitry 330 is one example of charge splitting correction ANN 126 of FIG. 1 and charge splitting correction ANN 208 of FIG. 2. As used herein, "deCSnet ANN" corresponds to an ANN architecture configured to reduce or eliminate charge splitting effects and is one example of charge splitting correction ANN 126, 208. deCSnet circuitry 330 is one example of a CNN. deCSnet circuitry 330 is configured to receive a CS ANN input 332 and to provide a CS ANN output 348. The CS ANN input 332 corresponds to a PU corrected estimate that may include charge splitting effects, e.g., intermediate estimate 125, 224, and the CS ANN output 348 corresponds to a PU and CS-corrected estimate, e.g., corrected spectral projection data output 122, PU and CS-corrected estimate 222.

deCSnet circuitry 330 includes a ReLU 334, a plurality of convolution blocks 336-1, 336-2, . . . , 336-6, a plurality of transpose convolution blocks 337-1, 337-2, 337-3, a plurality of concatenate layers 338-1, 338-2, 338-3, a summing node 342, and a plurality of skip connections 344-1, 344-2, 344-3, 345. The transpose convolution blocks, the concatenate layers, and a portion of the convolution blocks may be arranged in a plurality of composite blocks 340-1, 340-2, 340-3. For example, a first composite block 340-1 includes a first transpose convolution block 337-1, a first concatenate layer 338-1, and a fourth convolution block 336-4. Each convolution block includes a convolution layer and a respective ReLU, and each transpose convolution block includes a transpose convolution layer and a respective ReLU. Each convolution layer and each transpose convolution layer has a respective kernel size, k, a stride, s, and a number of kernels, n. The number of kernels may be related to a number of x-ray spectral channels (i.e., a number of energy bins, NE).

A first skip connection 344-1 is configured to couple a second convolution block 336-2 to a first concatenate layer 338-1; a second skip connection 344-2 is configured to couple a first convolution block 336-1 to a second concatenate layer 338-2; a third skip connection 344-3 is configured to couple ReLU 334 to a third concatenate layer 338-3; and a fourth skip connection 345 is configured to couple the CS ANN input 332 to the summing node 342. A second input to the summing node 342 corresponds to an output of the third composite block 340-3, e.g., a sixth convolution block 336-6.

In one nonlimiting example, an order of layers and blocks for deCSnet circuitry 330, beginning at the CS ANN input 332, may be ReLU 334, followed by three convolution blocks 336-1, 336-2, 336-3, followed by three composite blocks 340-1, 340-2, 340-3, followed by the summing node 342 and ending at the CS ANN output 348. Continuing with this example, each convolution block may have kernel size, k, 3 and a stride, s, of 1, and a number of kernels, n, of 16NE. Similarly, a first and a second transpose convolution block 337-1, 337-2 may have kernel size, k, 3 and a stride, s, of 1, and a number of kernels, n, of 16NE. A third transpose convolution block 337-3 may have kernel size, k, 3 and a stride, s, of 1, and a number of kernels, n, of 1NE. The convolution blocks of the first and second composite blocks 340-1, 340-2 may have kernel size, k, 1 and a stride, s, of 1, and a number of kernels, n, of 16NE and the convolution block of the third composite block 340-3 may have kernel size, k, 1 and a stride, s, of 1, and a number of kernels, n, of 1NE. However, this disclosure is not limited in this regard.

It may be appreciated that deCSnet 330 corresponds to a fully convolutional network, including shortcuts, and is configured to achieve deconvolution and denoising. In other words, the charge splitting process may be expressed as a convolution operation and deconvolution and denoising are the strengths of the fully convolutional network. It may be further appreciated that a structure of deCSnet 330 may be related to one or more of a group of specific GAN frameworks including, but not limited to, WGAN-VGG, WGAN-CPCE and GAN-CNN. In total, deCSnet 330 may include three blocks configured to compensate for the dimension reduction, and a ReLU layer at the input configured to connect to the dePUnet output, e.g., 304 of FIG. 3A. Each composite block, e.g., composite block 340-1, may be configured to concatenate an output of a transpose convolution block 337-1 that has received a block input from, e.g., a prior convolution block, e.g., the third convolution block 336-3, with an intermediate result of a same dimension from previous layers outside the block, e.g., the second convolution block 336-2. The concatenation may be followed by a projecting convolution layer with kernel size of 1×1, e.g., convolution layer 336-4. The concatenation may be configured to reduce a channel dimension and improve the computational efficiency, and form the block output. All convolution blocks and transpose convolution blocks may share a same number of kernels, e.g., 16NE, except for the last block 336-6 which has NE kernels to match an input dimension. The fourth skip connection (i.e., shortcut) 345 may directly connect the CS ANN input 332 to the CS ANN output 348. Thus, deCSnet 330 may correspond to a residual ANN.

Thus, the deCSnet architecture 330 is one example of a charge splitting correction ANN architecture, and may correspond to a fully convolutional NN.

Figure 3C:
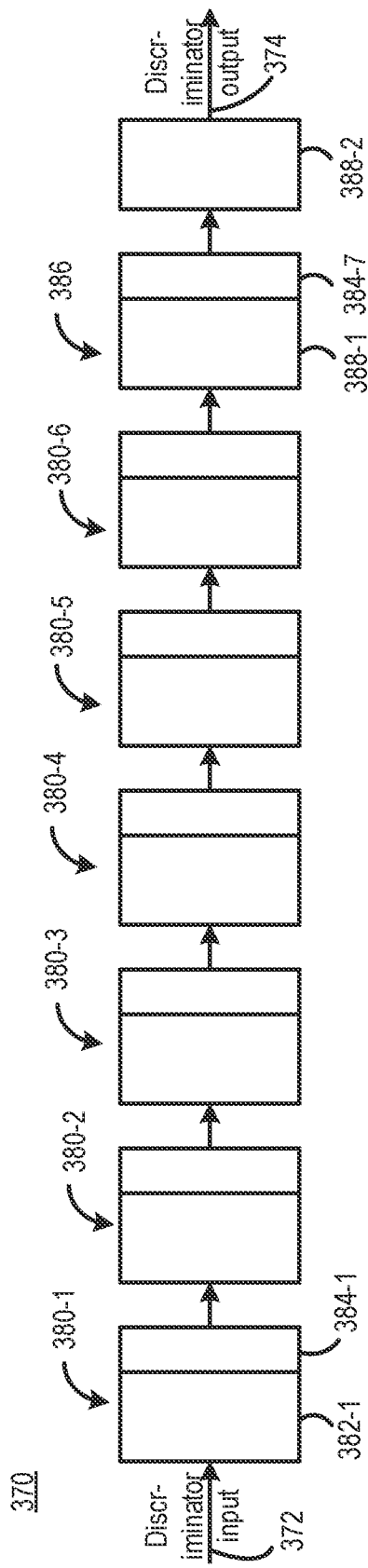
FIG. 3C illustrates a functional block diagram of one example discriminator ANN architecture.

FIG. 3C illustrates a functional block diagram 370 of an example discriminator ANN architecture. Discriminator ANN 370 is one example of discriminator ANN 218 of FIG. 2. Discriminator circuitry 370 corresponds to an artificial neural network (ANN) architecture configured to compare a ground truth target (e.g., p), with a generator output, i.e., corrected spectral projection data output (e.g., G(m)), in a WGAN framework, as described herein.

Discriminator ANN 370 is configured to receive a discriminator input 372 and to provide a discriminator output 374. The discriminator input 372 may correspond to corrected spectral projection data output 122 of FIG. 1, PU & CS corrected estimate 222 of FIG. 2. The discriminator output 374 may correspond to a WGAN loss, e.g., WGAN loss 238. In one nonlimiting example, discriminator ANN 370 architecture may correspond to WGAN-VGG and/or WGAN-CPCE. However, this disclosure is not limited regard.

Discriminator ANN 370 includes a plurality of convolution blocks 380-1, 380-2, . . . , 380-6, a fully connected block 386 (that includes a first fully connected layer 388-1 and a leaky ReLU 384-7), and a fully connected layer 388-2. Each convolution block, e.g., convolution block 380-1, includes a convolution layer 382-1 and a leaky ReLU 384-1. It may be appreciated that each leaky ReLU corresponds to an activation function. Each convolution layer has a respective kernel size, k, a stride, s, and a number of kernels, n.

In one nonlimiting example, a respective convolution layer of each convolution block 380-1, . . . , 380-6 may have a same kernel size, e.g., a kernel size of 3×3. The number of kernels, n, in the convolution layers may be 64, 64, 128, 128, 256, and 256 beginning with a first convolution block 380-1 and ending with a sixth convolution block 380-6. The strides for convolution blocks 380-1, 380-3, and 380-5 are 1 (i.e., are 1 for odd layers), and strides for convolution blocks 380-2, 380-3, and 380-6 are 2 (i.e., are 2 for even layers). An output of a final convolution block, i.e., sixth convolution block 380-6, may be flattened and connected to the fully-connected block 386, and an output of the fully connected block may be connected to the fully connected layer 388-2. A first fully connected layer 388-1 (i.e., of the fully connected block 386) may have a size of 1024 and a second fully connected layer 388-2 may have a size of 1. However, this disclosure is not limited in this regard.

Thus, discriminator circuitry 370 is one example of discriminator NN, of a WGAN framework.

Figure 4:
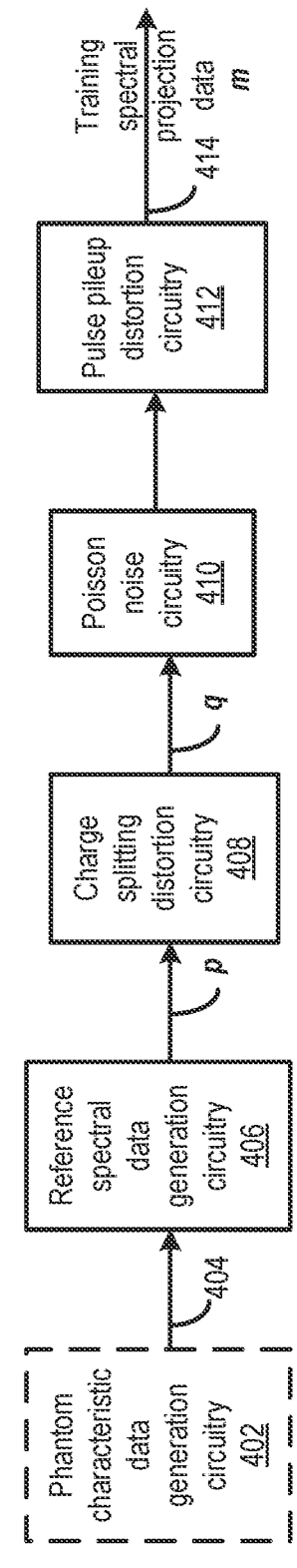
FIG. 4 illustrates a functional block diagram of a training spectral projection data generation system, according to an embodiment of the present disclosure.

FIG. 4 illustrates a functional block diagram 400 of a training spectral projection data generation system, according to an embodiment of the present disclosure. Training spectral projection data generation system 400 is one example of training data generation module 212 of FIG. 2. Training spectral data generation system 400 is configured to provide, as output, training spectral projection data 414. In some embodiments, training spectral projection data generation system 400 may include a phantom characteristic data generation circuitry 402. Training spectral projection data generation system 400 includes reference (i.e., ideal) spectral data generation circuitry 406, charge splitting distortion circuitry 408, Poisson noise circuitry 410, and pulse pileup distortion circuitry 412.

In operation, the phantom characteristic data generation circuitry 402 may be configured to provide phantom characteristic data 404 to reference spectral data generation circuitry 406. In some embodiments, the phantom characteristic data generation circuitry 402 may be configured to generate the phantom characteristic data 404, as described herein. Reference spectral data generation circuitry 406 may be configured to generate reference (i.e., ideal) spectral data, p, based, at least in part on phantom characteristic data 404, and based, at least in part, on actual or simulated x-ray source data, as described herein. Charge splitting distortion circuitry 408 is configured to produce charge splitting distortion, i.e., charge splitting effects, as described herein, in the reference spectral projection data, p, to yield CS distorted target data, q. The CS distorted data may then be used for training a data correction ANN, as described herein. Poisson noise circuitry 410 may be configured to provide noise, e.g., Poisson noise, that may then be incorporated into the CS distorted data, as described herein. Pulse pileup distortion circuitry 412 is configured to produce pulse pileup distortion, i.e., pulse pileup effects, as described herein, in the noisy CS distorted target data to yield PU and CS distorted target data that may then correspond to training input spectral projection data, m. The PU and CS distorted target data may then be used for training the data correction ANN, as described herein.

Figure 5:
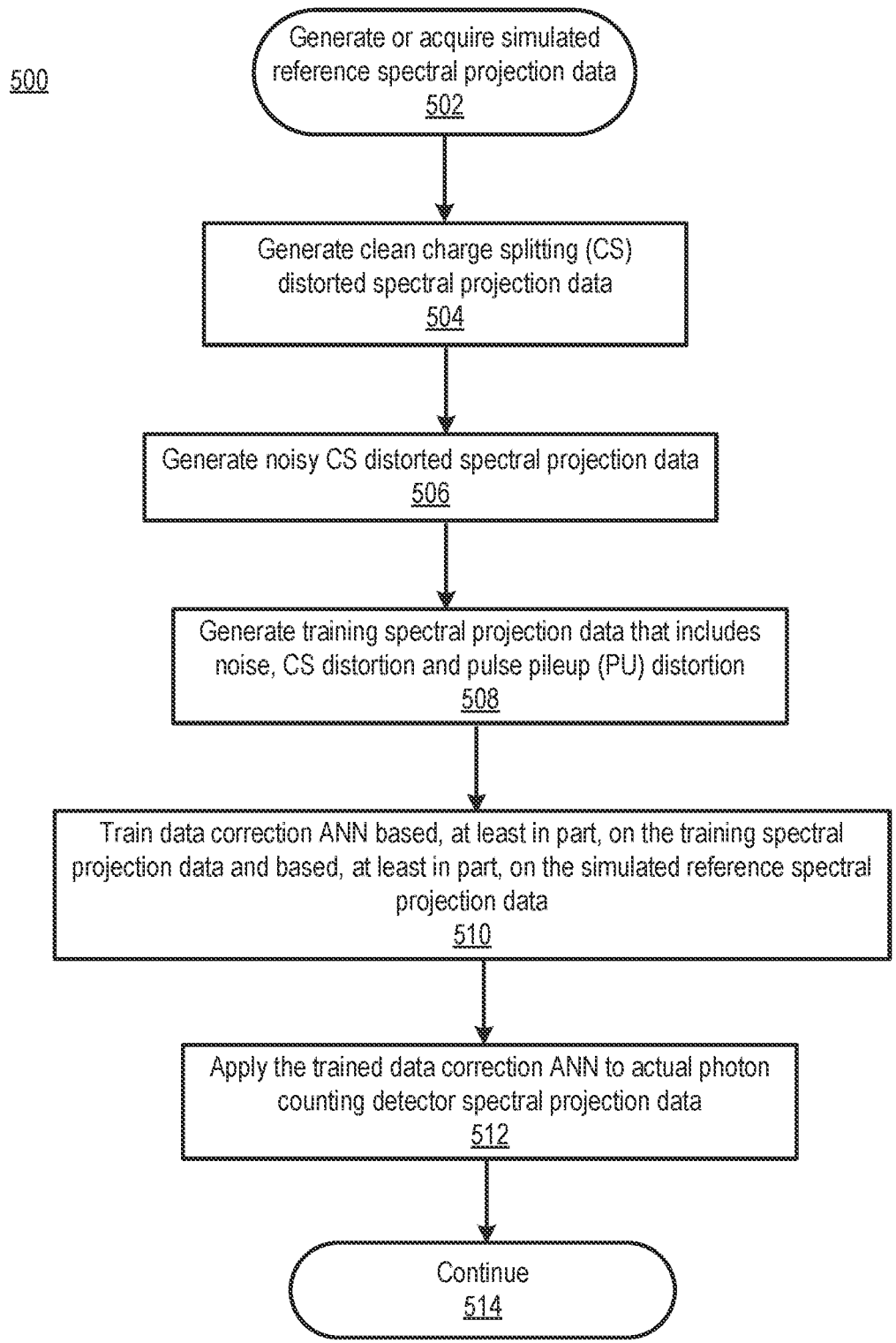
FIG. 5 is a flowchart of deep learning x-ray photon counting data correction operations, according to various embodiments of the present disclosure.

FIG. 5 is a flowchart 500 of deep learning x-ray photon counting data correction operations, according to various embodiments of the present disclosure. In particular, the flowchart 500 illustrates generating or acquiring simulated reference spectral projection data, generating training spectral projection data, and training and using a deep learning system for x-ray photon counting data correction. The operations may be performed, for example, by the deep learning system for x-ray photon counting data correction 100 (e.g., data correction ANN 102, data correction management module 106, and/or training module 108) of FIG. 1 and/or the example x-ray photon counting data correction training system 200 (e.g., data correction ANN 202, and/or training module 204) of FIG. 2.

Operations of this embodiment may begin with generating or acquiring simulated reference spectral projection data at operation 502. Operation 504 includes generating clean charge splitting (CS) distorted spectral projection data. Operation 506 includes generating noisy CS distorted spectral projection data. Operation 508 includes generating training spectral projection data that include noise, CS distortion, and pulse pileup (PU) distortion. Data correction ANN may be trained based, at least in part, on the training spectral projection data, and based, at least in part, on the simulated reference spectral projection data at operation 510. The trained data correction ANN may be applied to actual photon counting detector spectral projection data at operation 512. Program flow may then continue at operation 514.

Thus, simulated reference spectral projection data may be generated or acquired, and a deep learning system, including a pulse pileup correction ANN and a charge splitting correction ANN may be trained and applied, configured to correct, i.e., mitigate, charge splitting effects, pulse pileup affects, and/or noise, in photon counting detector spectral projection data.

It may be appreciated that simulating photon counting detector data may be based, at least in part, on simulating (or modeling) an energy spectrum of an x-ray tube. x-ray tube characteristics may be proprietary, thus, the energy spectrum of the x-ray tube may be estimated based, at least in part, on physical measurements of dedicated phantoms. The phantoms may be configured with known attenuation properties and thicknesses, and may then be used to generate projection data. The estimation operations may include solving a system of linear equations, which is generally, ill-conditioned and/or ill-posed.

In practice, aluminum (Al) and polymethyl methacrylate (PMMA) may be commonly used for spectrum estimation. Step-wedge phantoms or slabs made of these materials may be used to form representative attenuating paths. The measurement process usually involves tens of combinations and is relatively time-consuming. Increasing a number of combinations may not reduce the ill-posedness of the problem due to relatively insignificant changes in projection data since small thickness variation of light materials may leads to similar attenuation curves. Thus, an investigation for a relatively more effective combination of different materials and their thicknesses may alleviate the ill-posedness and may be beneficial for increased spectrum estimation accuracy with a decreased number of measurements, thus saving labor and cost.

In an embodiment, an optimal combination of material types and thicknesses in the set of Al, PMMA, copper (Cu), and iron (Fe) may be identified. In an embodiment, a Genetic Algorithm (GA) may be used to minimize a condition number of a corresponding system matrix, A. The system matrix, A, may be determined based, at least in part, on phantom characteristics including, but not limited to, physical dimensions, e.g., thickness(es) at a plurality of locations in the phantom, material characteristics, e.g., linear attenuation coefficients of the material within the $j^{th}$ energy bin.

It may be appreciated that a phantom with a linear change in thickness may result in a Vandermonde-like system matrix, which may be relatively highly ill-conditioned. In an embodiment, a nonlinearity may be introduced, a form of the system matrix may be changed, and the condition number of the system matrix may be improved. A Genetic Algorithm (GA) may be configured to search for an optimal phantom design with respect to material types and thicknesses so that the condition number of the system matrix may be minimized. In one nonlimiting example, a general case of M≠N may be considered. The condition number may be determined in a least square sense with a 2-norm:

$$cond_2(A) = \|A\|_2 \|A^+\|_2 = \frac{\sigma_{max}}{\sigma_{min}},$$

where A+ is the pseudoinverse of A, and $\sigma_{max}$ and $\sigma_{min}$ correspond to a maximum and a minimum non-zero singular value of A, respectively.

Generally, a genetic algorithm may include a series of operations, including, but not limited to chromosome representation, crossover operation, mutation operation, fitness calculation, and selection. In one nonlimiting example, a genetic algorithm, according to the present disclosure, may be configured to enhance selection and/or identification of a phantom design. After identifying a relatively better phantom configuration, e.g., thickness(es) and/or material selection, an associated x-ray spectrum may be estimated using, for example, expectation maximum (EM) estimation.

In chromosome representation, a number, M, phantom thicknesses for measurement may be implemented as a vector, $l=[l_1, l_2, \ldots, l_M]$ representing a chromosome. Each element or gene of a chromosome may be bounded within, for example, $[l_0; L]$ (unit: cm). The thickness may be discretized at a relatively high resolution dl«L. The chromosomes may be initialized with an uniform random number generator within ($l_0$; L), followed by discretization and sorting in an ascending order.

A crossover operation may be configured to increase a variability of the chromosomes. In this operation, one pair of two randomly selected chromosomes from a parent generation are selected to generate two children by mixing the genes from the parents. The generation process may include three steps: first, the positions of the genes to be mixed are randomly selected (each gene position has a 50% chance to be selected); then, the mixing ratio $r_m$ $r_m \in (0, 1)$ for each selected position may be uniformly and randomly generated to mix the parent genes in the position, and two types of new genes may be generated following:

$(1-r_m)l_i^{\{a\}}+r_m l_i^{\{b\}}$ (type-1) and $r_m l_i^{\{a\}}+(1-r_m)l_i^{\{b\}}$ (type-2)

where $l_i^{\{a\}}$ and $l_i^{\{b\}}$ are two parent genes. Finally, two children chromosomes are generated by replacing the genes of parent chromosomes $l^{\{a\}}$ and $l^{\{b\}}$ for each and every selected positions with the type-1 and type-2 children genes, respectively. The crossover operation is repeated multiple times according to the product of a predefined crossover probability and the population size. The generated children chromosomes may be added into the population after all crossover operations are finished.

A mutation operation may follow the crossover stage, and is configured to increase the gene types of the population via random modification. Each chromosome has a same predefined probability to be mutated. The mutation process may include following steps: first, one mutation position $l_i$ is randomly selected for the chromosome; then, the gene on the position $l_i$ is increased or decreased with equal possibility by a random amount, and specifically, the change may be computed as follows:

$$l_i = \begin{cases} l_i - (l_i - l_0)r_s(1-\gamma)^2, & \text{for decrements;} \\ l_i + (L - l_o)r_s(1-\gamma)^2, & \text{for increments,} \end{cases}$$

where $r_s$ is a uniformly distributed random scaling factor drawn from (0; 1) for each mutation; and γ is the generation ratio defined by the current number of generations over the maximum number of generations, which is configured to help regulate the converging behavior of the solution.

A fitness calculation may include defining fitness. The fitness may be defined by a merit function to determine the quality of each chromosome. The condition number of the system matrix may be used as a measure (and may be determined with 1, $l_0$ and L), and the fitness as a negative logarithm of the condition number may be determined. The results of the population may then be normalized to have a predefined mean and unit variance. The predefined target mean may correspond to a hyper-parameter. After the normalization, the negative tail is configured to be truncated to zero.

After the population augmentation via crossover and mutation, the selection operation may mimic the natural selection for evolution to control the population size to a predefined level $N_{pop}$ based on the fitness of the chromosomes. The survival chromosomes may be randomly selected by repetitively spinning a weighted roulette wheel $N_{pop}$ times. The weight/chance of a chromosome being selected is defined as the fitness of the chromosome over the sum of all fitness of the population. It may be appreciated that the fitness of the best chromosome may be enlarged by several folds (a preset hyper-parameter) before the selection, to adopt an elitism strategy. The thicknesses coded in chromosomes may be sorted in an ascending order after each selection operation to fix the disorder caused during crossover and mutation.

After the chromosome initialization, the genetic operations (crossover, mutation, fitness calculation, and selection) may be iterated to reach a maximum number of generations. Then, the best quality solution can be found in the youngest generation. The hyperparameters may include the maximum number of generations, the population size, the crossover probability, the mutation probability, the population mean of fitness to be normalized to, and the boosting factor for best chromosomes.

Thus, phantom characteristic data, including, but not limited to, thickness(es) and/or material selection may be optimized based, at least in part, on genetic optimization algorithm. The spectral projection data may then be estimated based, at least in part, on the optimized phantom and based, at least in part, on an expectation maximum technique.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hardwired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for x-ray photon-counting data correction, the method comprising:
    generating, by a training data generation module, training input spectral projection data based, at least in part, on a reference spectral projection data, the training input spectral projection data comprising at least one of a pulse pileup distortion, a charge splitting distortion, and/or noise; and
    training, by a training module, a data correction artificial neural network (ANN) based, at least in part, on training data, the data correction ANN comprising a pulse pileup correction ANN, and a charge splitting correction ANN, the training data comprising the training input spectral projection data and the reference spectral projection data.

2. The method of claim 1, wherein the training is performed in a Wasserstein generative adversarial network (WGAN) framework.

3. The method of claim 1, further comprising:
    generating, by the pulse pileup correction ANN, an intermediate estimate based, at least in part, on the training input spectral projection data; and determining, by a guidance loss circuitry, a guidance loss based, at least in part, on the intermediate estimate, and based, at least in part, on a charge splitting distorted target, the charge splitting distorted target included in the training data.

4. The method of claim 3, further comprising:
generating, by the charge splitting correction ANN, a pulse pileup and charge splitting corrected estimate based, at least in part, on the intermediate estimate; and
determining, by a correction loss ANN, a correction loss based, at least in part, on the pulse pileup and charge splitting corrected estimate, and based, at least in part, on a ground truth target, the ground truth target included in the training data.

5. The method of claim 3, further comprising:
generating, by the charge splitting correction ANN, a pulse pileup and charge splitting corrected estimate based, at least in part, on the intermediate estimate; and
determining, by a discriminator ANN, a WGAN loss based, at least in part, on the pulse pileup and charge splitting corrected estimate, and based, at least in part, on a ground truth target.

6. The method of claim 1, further comprising correcting, by the data correction ANN, an actual input spectral projection data to reduce or eliminate one or more of a pulse pileup effect, and/or a charge splitting effect.

7. The method of claim 1, wherein the training comprises determining a loss function, the loss function comprising a guidance loss, a correction loss, and a discriminator loss.

8. A data correction artificial neural network (ANN) for x-ray photon-counting data correction, the data correction ANN comprising:
a pulse pileup correction ANN; and
a charge splitting correction ANN,
the pulse pileup correction ANN and the charge splitting correction ANN trained based, at least in part, on training data, the training data comprising training input spectral projection data and a reference spectral projection data, the training input spectral projection data generated based, at least in part, on the reference spectral projection data, the training input spectral projection data comprising at least one of a pulse pileup distortion, a charge splitting distortion, and/or noise.

9. The data correction ANN of claim 8, wherein the training is performed in a Wasserstein generative adversarial network (WGAN) framework.

10. The data correction ANN of claim 8, wherein the pulse pileup correction ANN is configured to receive actual input spectral projection data and to provide an intermediate estimate, the intermediate estimate corrected for pulse pileup effects.

11. The data correction ANN of claim 10, wherein the charge splitting correction ANN is configured to receive the intermediate estimate and to provide a corrected spectral projection data output, the corrected spectral projection data output corrected for pulse pileup effects and charge splitting effects.

12. The data correction ANN of claim 8, wherein the reference spectral projection data is generated based, at least in part, on a phantom.

13. The data correction ANN of claim 8, wherein the pulse pileup correction ANN corresponds to a representation network, and the charge splitting correction ANN corresponds to a convolutional neural network.

14. A deep learning system for x-ray photon-counting data correction, the deep learning system comprising:
a data correction artificial neural network (ANN) comprising a pulse pileup correction ANN, and a charge splitting correction ANN;
a training data generation module configured to generate training input spectral projection data based, at least in part, on a reference spectral projection data, the training input spectral projection data comprising at least one of a pulse pileup distortion, a charge splitting distortion, and/or noise; and
a training module configured to train the data correction ANN based, at least in part, on the training data.

15. The deep learning system of claim 14, wherein the training is performed in a Wasserstein generative adversarial network (WGAN) framework.

16. The deep learning system of claim 14, wherein:
the pulse pileup correction ANN is configured to generate an intermediate estimate based, at least in part, on the training input spectral projection data; and
a guidance loss circuitry is configured to determine a guidance loss based, at least in part, on the intermediate estimate, and based, at least in part, on a charge splitting distorted target, the charge splitting distorted target included in the training data.

17. The deep learning system of claim 16, wherein:
the charge splitting correction ANN is configured to generate a pulse pileup and charge splitting corrected estimate based, at least in part, on the intermediate estimate; and
a correction loss circuitry is configured to determine a correction loss based, at least in part, on the pulse pileup and charge splitting corrected estimate, and based, at least in part, on a ground truth target, the ground truth target included in the training data.

18. The deep learning system of claim 16, wherein:
the charge splitting correction ANN is configured to generate a pulse pileup and charge splitting corrected estimate based, at least in part, on the intermediate estimate; and
a discriminator ANN is configured to determine a WGAN loss based, at least in part, on the pulse pileup and charge splitting corrected estimate, and based, at least in part, on a ground truth target.

19. The deep learning system of claim 14, wherein the data correction ANN is configured to correct an actual input spectral projection data to reduce or eliminate one or more of a pulse pileup effect, and/or a charge splitting effect.

20. The deep learning system of claim 14, wherein the pulse pileup correction ANN corresponds to a representation neural network, and the charge splitting correction ANN corresponds to a convolutional neural network.

* * * * *